US008053121B2

United States Patent
Brown et al.

(10) Patent No.: US 8,053,121 B2
(45) Date of Patent: Nov. 8, 2011

(54) SYSTEM AND METHOD FOR SWITCHING A DUAL MODE ELECTROCHEMICAL CELL STACK BETWEEN MODES OF OPERATION

(75) Inventors: Christopher Brown, Cohoes, NY (US); Jeffrey W. Schrieber, Troy, NY (US)

(73) Assignee: Honda Motor Co., Ltd., Tokyo (JP)

( * ) Notice: Subject to any disclaimer, the term of this patent is extended or adjusted under 35 U.S.C. 154(b) by 842 days.

(21) Appl. No.: 11/985,063

(22) Filed: Nov. 13, 2007

(65) Prior Publication Data

US 2009/0123786 A1    May 14, 2009

(51) Int. Cl.
  *H01M 8/00*    (2006.01)
  *H01M 8/04*    (2006.01)
(52) U.S. Cl. ......... 429/428; 429/400; 429/430; 429/432
(58) Field of Classification Search .................. 429/428
  See application file for complete search history.

(56) References Cited

U.S. PATENT DOCUMENTS

| | | | | |
|---|---|---|---|---|
| 5,411,528 | A | * | 5/1995 | Miller et al. ...................... 607/5 |
| 2007/0148507 | A1 | * | 6/2007 | Mason et al. .................... 429/17 |
| 2007/0188025 | A1 | * | 8/2007 | Keagy et al. .................. 307/115 |

* cited by examiner

*Primary Examiner* — Ula C. Ruddock
*Assistant Examiner* — Patricia Davis
(74) *Attorney, Agent, or Firm* — Nelson Mullins Riley & Scarborough LLP; Anthony A. Laurentano

(57) ABSTRACT

A system and technique for switching the polarity of an electrochemical cell stack to switch operation of the stack between a power producing mode of operation and an electrochemical pumping mode of operation is provided. The system and technique include a plurality of polarity switches that are switched between configurations in response to a mode select signal.

7 Claims, 5 Drawing Sheets

SYSTEM AND METHOD FOR SWITCHING A DUAL MODE ELECTROCHEMICAL CELL STACK BETWEEN MODES OF OPERATION

BACKGROUND

The invention generally relates to an electrochemical cell system that may be selectively switched between a power producing mode and an electrochemical pumping mode of operation.

A fuel cell is an electrochemical device that converts chemical energy directly into electrical energy. For example, one type of fuel cell includes a proton exchange membrane (PEM) that permits only protons to pass between an anode and a cathode of the fuel cell. Typically PEM fuel cells employ sulfonic-acid-based ionomers, such as Nafion, and operate in the 50° Celsius (C.) to 75° C. temperature range. Another type employs a phosphoric-acid-based polybenziamidazole, PBI, membrane that operates in the 150° to 200° temperature range. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

Anode: $H_2 \rightarrow 2H^+ + 2e^-$  Equation 1

Cathode: $O_2 + 4H^+ + 4e^- \rightarrow 2H_2O$  Equation 2

The PEM fuel cell is only one type of fuel cell. Other types of fuel cells include direct methanol, alkaline, phosphoric acid, molten carbonate and solid oxide fuel cells.

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one cell of the stack. The plates may include various surface flow channels and orifices to, as examples, route the reactants and products through the fuel cell stack. Electrically conductive gas diffusion layers (GDLs) may be located on each side of a catalyzed PEM to form the anode and cathodes of each fuel cell. In this manner, reactant gases from both the anode and cathode flow-fields may diffuse through the GDLs to reach the catalyst layers.

In general, a fuel cell is an electrochemical cell that operates in a forward mode to produce power. In the forward mode, the voltage across the stack has a first polarity. However, the electrochemical cell may be operated in a reverse mode in which the polarity of the voltage across the stack is reversed and the cell produces hydrogen and oxygen from electricity and water. More specifically, an electrolyzer splits water into hydrogen and oxygen with the following reactions occurring at the anode and cathode, respectively:

Anode: $2H_2O < O_2 + 4H^+ + 4e^-$  Equation 3

Cathode: $4H^+ + 4e^- \rightarrow 2H_2$  Equation 4

An electrochemical cell may also be operated as an electrochemical pump in the reverse mode. For example, the electrochemical cell may be operated as a hydrogen pump, a device that produces a relatively pure hydrogen flow at a cathode exhaust of the cell relative to an incoming reformate flow that is received at an anode inlet of the cell. In general, when operated as an electrochemical pump, the cell has the same overall topology of the fuel cell. In this regard, similar to a fuel cell an electrochemical cell that operates as a hydrogen pump may contain a PEM, gas diffusion layers (GDLs) and flow plates that establish plenum passageways and flow fields for communicating reactants to the cell. However, unlike the arrangement for the fuel cell, the electrochemical pump cell receives an applied voltage such that the voltage across the stack has a polarity that is reverse of the voltage when operating as a fuel cell, and in response to the received current, hydrogen migrates from the anode chamber of the cell to the cathode chamber of the cell to produce hydrogen gas in the cathode chamber. A hydrogen pump may contain several such cells that are arranged in a stack.

In some electrochemical cell systems, it may be desirable to selectively operate the electrochemical cell stack in either the fuel cell mode in which power is produced by the stack or in the pump mode in which hydrogen is produced by the stack. To selectively operate the stack between the two modes, the polarity of the voltage across the stack is reversed.

SUMMARY

In an embodiment of the invention, a technique includes providing a plurality of polarity switches coupled between a dual mode electrochemical cell stack and a power conditioning subsystem. The polarity switches are configured in a first configuration to operate the stack in a first mode of operation in which a voltage across the stack has a first polarity. The polarity switches are configured in a second configuration to operate the stack in a second mode of operation in which the voltage across the stack has a second polarity opposite the first polarity.

In another embodiment of the invention, a system includes an electrochemical cell stack having a pair of stack terminals, the stack operable in a first mode of operation, in which a voltage across the stack terminals has a first polarity, and a second mode of operation in which the voltage across the stack terminals has a second polarity reverse of the first polarity. The system further includes a power conditioning subsystem and a plurality of polarity switches coupled between the stack terminals and the power conditioning subsystem. A control subsystem is adapted to configure the polarity switches in a first configuration to operate the stack in one of the first mode of operation and the second mode of operation. The control subsystem is further adapted to configure the polarity switches in a second configuration to reverse the polarity of the voltage across the stack terminals to operate the stack in the other of the first and second modes of operation.

Advantages and other features of the invention will become apparent from the following drawing, description and claims.

DETAILED DESCRIPTION

Figure 1:
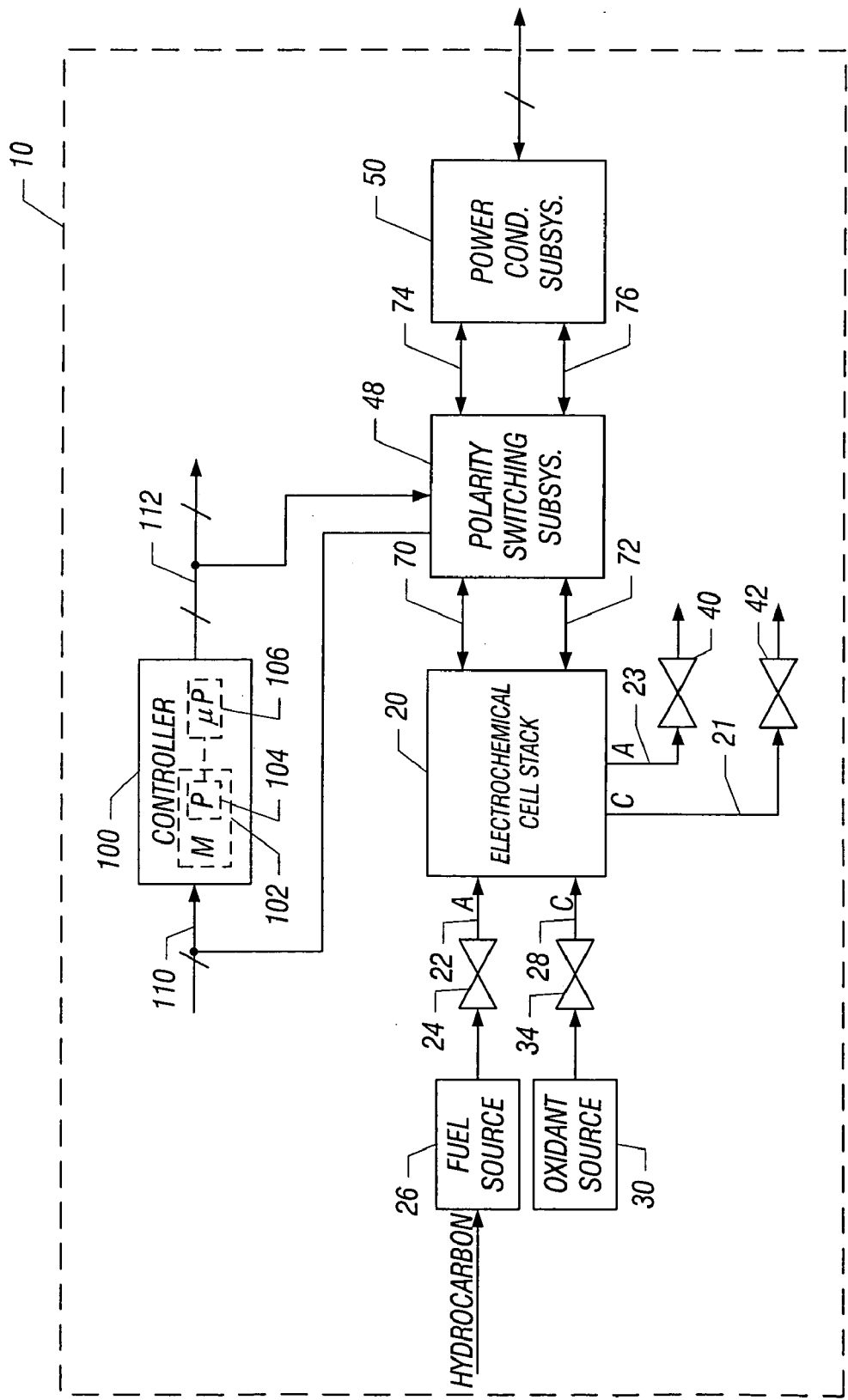
FIG. 1 is a schematic diagram of an electrochemical cell system according to an embodiment of the invention.

Referring to FIG. 1, an electrochemical cell system 10 in accordance with embodiments of the invention includes an electrochemical cell stack 20 (a PEM stack, as an example) that functions in one of two modes: a power producing mode in which the stack 20 produces electrical power; and an electrochemical pumping mode in which the stack 20 operates as an electrochemical pump to purify an incoming fuel flow to produce a purified fuel flow (a hydrogen fuel flow, for example). In the power producing mode, the electrochemical cell stack 20 receives an incoming fuel flow at its anode inlet 22. The incoming fuel flow may be a reformate flow (50 percent hydrogen, for example), which is furnished by a fuel source 26. As a more specific example, the fuel source 26 may receive an incoming hydrocarbon flow (a liquefied petroleum gas or natural gas flow, as examples), and the fuel source 26 reforms the hydrocarbon flow to produce the incoming flow, a reformate, which is received at the anode inlet 22. In general, the incoming fuel flow flows through the flow channels of the anode chamber of the stack 20 to promote electrochemical reactions pursuant to Eqs. 1 and 2. The anode flow through the stack 20 produces a corresponding anode exhaust flow at an anode outlet 23 of the stack 20. As examples, the anode exhaust may be partially routed back to the anode inlet 22, may be vented to ambient, may be routed to a flare or oxidizer, etc., depending on the particular embodiments of the invention.

The stack 20 also receives an incoming oxidant flow at a cathode inlet 28. In this regard, an oxidant source 30 (an air compressor or blower, as examples) may furnish an airflow that serves as the oxidant flow to the stack 20. The incoming oxidant flow is routed through the flow channels of the cathode chamber of the stack 20 for purposes of promoting the electrochemical reactions (see Eqs. 1 and 2) inside the stack 20 to produce electrical power. The oxidant flow through the cathode chamber produces a cathode exhaust flow, which appears at a cathode outlet 21 of the stack 20.

As depicted in FIG. 1, the electrochemical cell system 10 may include valves 24 and 34, which are operated by a controller 100 for purposes of controlling the incoming fuel and oxidant flows, respectively, to the fuel cell stack 20. Additionally, the electrochemical cell system 10 may include valves 40 and 42, which are operated by the controller 100 for purposes of controlling the fuel exhaust and oxidant exhaust, respectively, from the stack 20. As further described below, during the transition between the power producing and pumping modes, the controller 100 operates the valves 34 and 42 to isolate the cathode chamber of the stack 20 from any incoming oxidant flow. The controller 100 may likewise operate the valves 24 and 40 for purposes of closing off communication with the anode chamber of the stack 20.

During the electrochemical pumping mode, the controller 100 closes off the valve 34 and opens the valves 24, 40 and 42 for purposes of allowing reformate from the fuel source 26 to flow through the anode chamber of the stack 20. In this mode of operation, the stack 20 receives electrical power (as further described below) and promotes electrochemical reactions to purify the reformate flow to produce hydrogen, which appears at the cathode outlet 21.

The electrochemical cell system 10 includes a power conditioning subsystem 50 that, during the power producing mode of the stack 20, receives the power from the stack 20 and conditions the power into the appropriate form for the loads of the system 10. In this regard, the loads may include auxiliary loads of the electrochemical cell system 10, as well as external loads (residential or commercial AC or DC loads, as examples) and possibly an AC power grid. During the electrochemical cell pumping mode, the power conditioning subsystem 50 provides electrical power to the stack 20. The origin of this electrical power may be the AC power grid, energy that is stored in an energy storage 60 (a battery bank, for example (see FIG. 2)) or another source of power.

Figure 2:
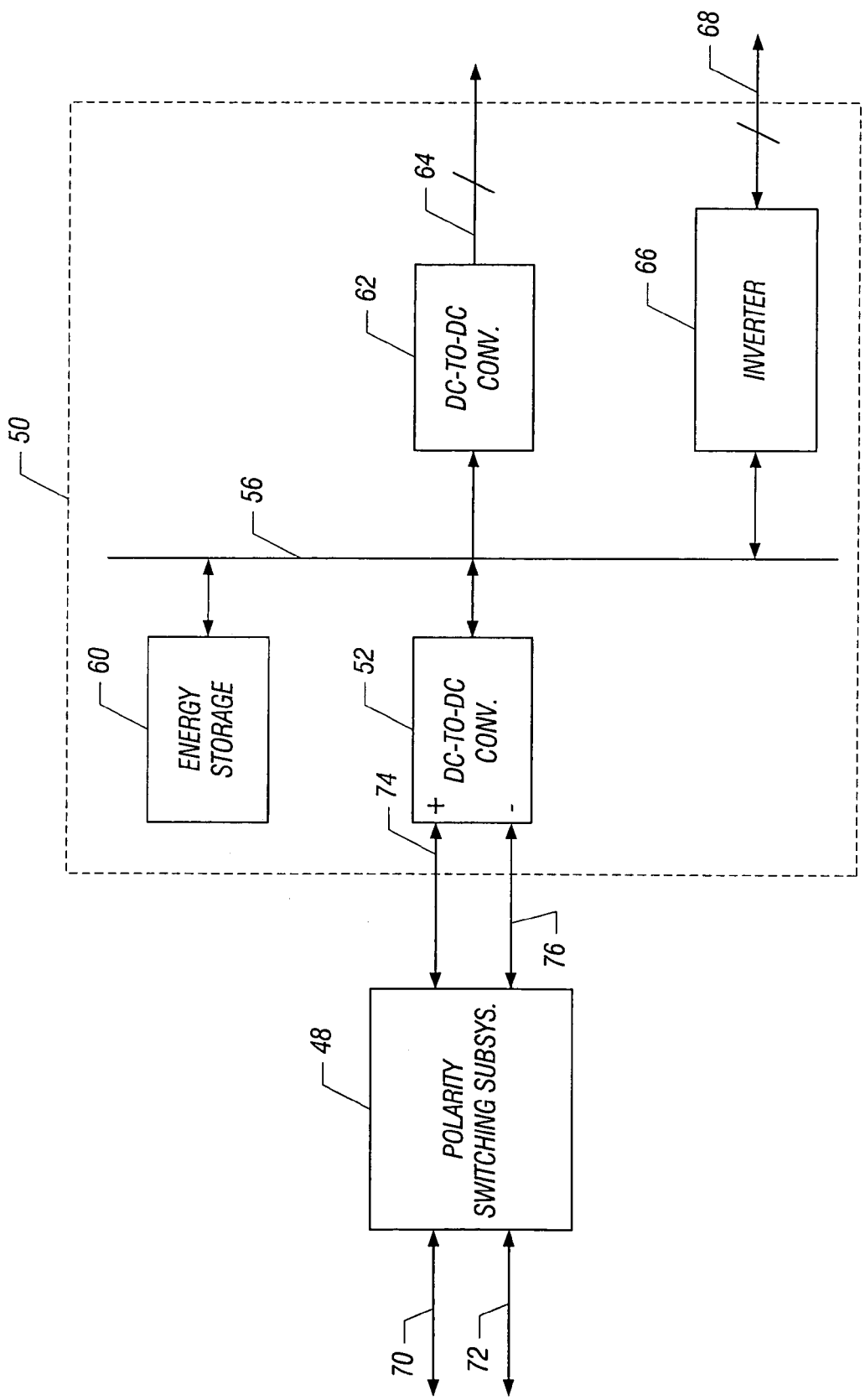
FIG. 2 is a schematic diagram of an exemplary power conditioning subsystem for the electrochemical cell system of FIG. 1.

With reference now to FIG. 2, in accordance with some embodiments of the invention, the power conditioning subsystem 50 includes a DC-to-DC converter 52, which, during the power producing of the stack 20, converts the DC stack voltage into a voltage level for a bus 56. The energy storage 60 is also coupled to the bus 56, and therefore, during the power producing mode of the stack 20, power is transferred via the bus 56 to store energy in the energy storage 60. As also depicted in FIG. 2, the power conditioning subsystem 50 may include additional components for purposes of conditioning the power from the bus 56 into the appropriate form for the loads of the system 10. More specifically, the power conditioning subsystem 50 may include another DC-to-DC converter 62, which converts the voltage of the bus 56 into the appropriate voltage or voltages (which appear on output lines 64) to auxiliary and internal loads of the system 10. In some embodiments of the invention, the power conditioning subsystem 50 may include an inverter 66, which converts the DC voltage from the power bus 56 into one or more AC voltages (that appear on terminal 68) for various external auxiliary AC loads and possibly the AC power grid.

For the electrochemical pumping mode, the inverter 66, as an example, may deliver power from the AC grid by communicating an AC signal received at the terminal 68 into the appropriate voltage level for the bus 56. For this mode of operation, the converter 52 communicates power from the bus 56 to the stack 20 by converting the voltage level of the bus 56 into the appropriate DC stack level for promoting the electrochemical cell pumping.

Among the other features of the electrochemical cell system 10, the system 10 may include a polarity switching subsystem 48, which is coupled between terminals 70 and 72 of the stack 20 and terminals 74 and 76 of the power conditioning subsystem 50 for purposes of ensuring the appropriate polarity exists between the terminals of the stack 20 and the power conditioning subsystem 50. In this regard, the polarity of the stack terminals is reversed between the power producing and electrochemical pumping modes of the stack 20.

As also shown in FIG. 1, the controller 100 may include a processor 106 (representative of one or more microprocessors and/or microcontrollers), which executes instructions 104 that are stored in a memory 102 for purposes of controlling the various aspects of the system 10. In this regard, the controller 100 may include various output terminals 112 for purposes of regulating operation of the fuel source 26; opening and closing valves (such as the valves 24, 28, 40 and 42, as examples); operating various motors (such as a motor of the oxidant source 30, for example), controlling the power mode to electrochemical pumping mode transition, including the reversing of the voltage polarity across the stack 20 as described herein; regulating operation of the converters 52 and 62; regulating operation of the inverter 66; etc., as just a few examples. The controller 100 also includes various input terminals 110 for purposes of monitoring sensed conditions (such as the condition of the polarity switching subsystem 48 as described herein) and voltages of the system 10, as well as receiving commands and other information for purposes of controlling operations of the system 10.

It is noted that the system depicted in FIGS. 1 and 2 is merely for purposes of example, as certain aspects of the system have been simplified for purposes of clarifying the certain aspects of the invention described herein. Furthermore, other variations of the system 10 are contemplated and are within the scope of the appended claims.

Figure 3:
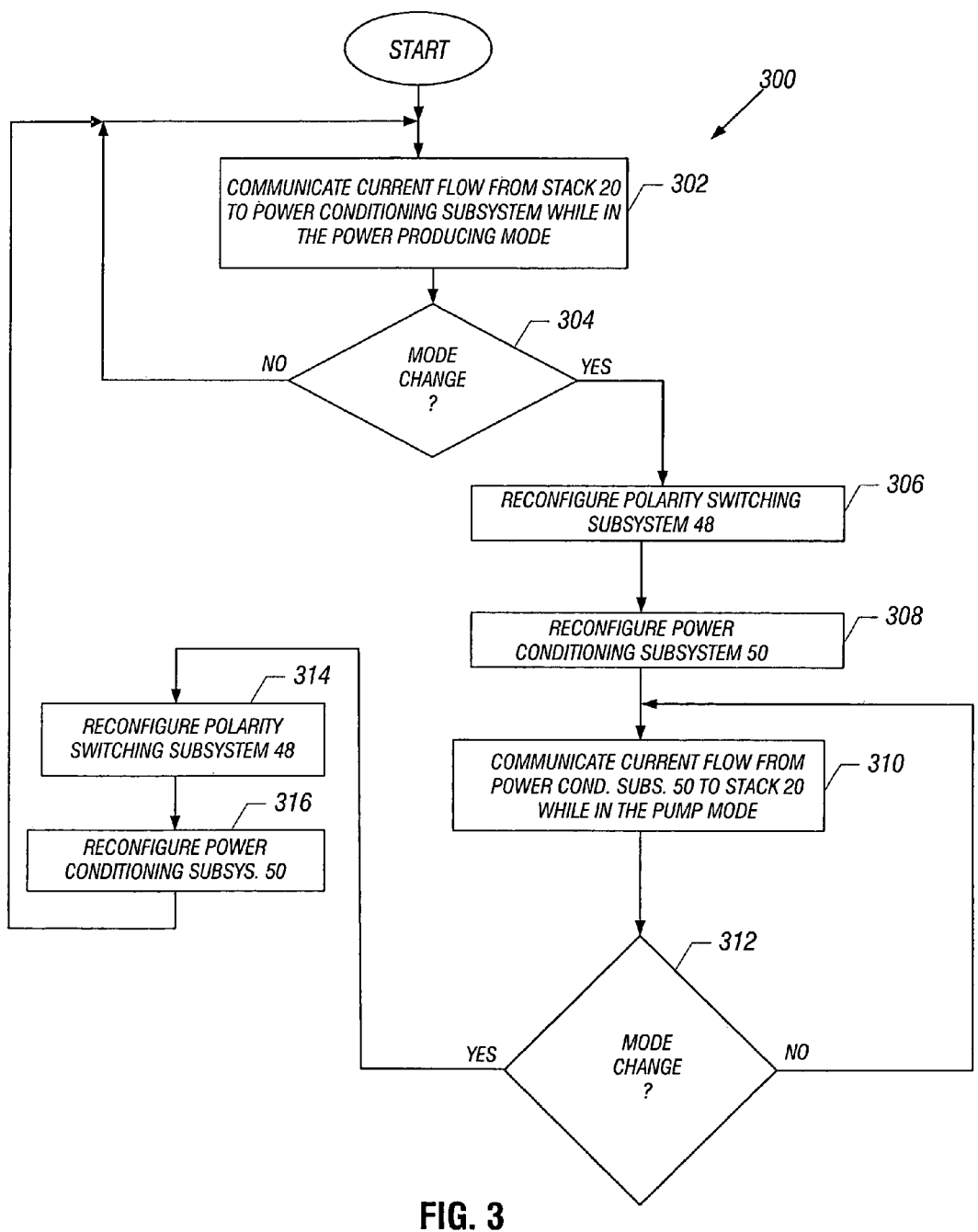
FIG. 3 is a flow diagram of a technique to switch the electrochemical cell system of FIG. 1 between a power producing mode of operation and a pumping mode of operation according to an embodiment of the invention.

Referring to FIG. 3 in conjunction with FIGS. 1 and 2, in accordance with embodiments of the invention, a technique 300 may be used for purposes of configuring the polarity switching subsystem 48 and the powering conditioning subsystem 50 based on the desired mode of operation of the stack 20. Pursuant to the technique 300, an electrical current flow is communicated from terminal 70 of the stack 20 to the power conditioning subsystem 50 while the stack 20 is in the power producing mode, pursuant to block 302. When a mode change occurs (as indicated in diamond 304), the controller 100 reconfigures the system 10 for the pump mode. More specifically, the controller 100 reconfigures the polarity switching subsystem 48 to reverse the polarity of the voltage at the terminals 70 and 72 of the stack 20 (block 306); and, the controller 100 reconfigures (block 308) the power conditioning module 50 to provide an electrical current flow to the stack 20 through the terminals 72 and 70 (block 310).

When a mode change occurs again (as depicted in diamond 312), the controller 100 once again reconfigures the system 10 accordingly. In this regard, the controller 100 reconfigures (block 314) the polarity switching subsystem 48 to reverse the polarity of the stack terminals 70 and 72 for the power producing mode and reconfigures (block 316) the power conditioning subsystem 50 for a current from the stack 20 to the system 50. After this reconfiguration, control returns to block 302, where current flow from the stack 20 to the power conditioning subsystem 50 while the stack 20 is in the power producing mode.

Figure 4:
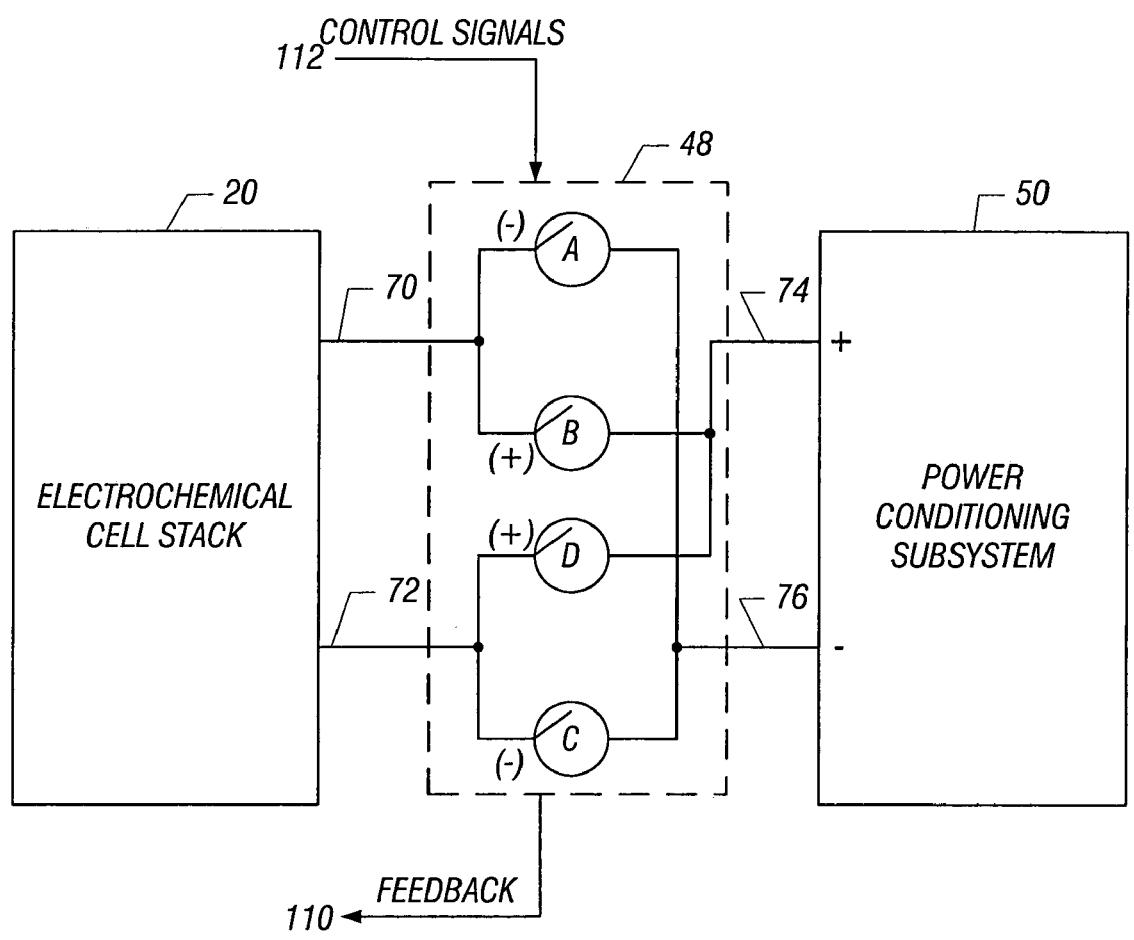
FIG. 4 is a schematic diagram illustrating the polarity switching subsystem of FIG. 1 according to an embodiment of the invention.

With reference to FIG. 4, and as a more specific example of the reconfiguration of the polarity switching subsystem 48, during the power producing mode of the stack 20, the controller 100 causes polarity switches B and C to close and polarity switches A and D to open to couple the stack terminal 70 to the power conditioning subsystem terminal 74 and the stack terminal 72 to the power conditioning subsystem terminal 76. During this mode of operation, a positive voltage polarity is provided between stack terminals 70(+) and 72(−), and the stack 20 provides a current flow to the power conditioning subsystem 50. During this mode of operation, the controller 100 may also reconfigure the power conditioning subsystem 50. For instance, the converter 52 may be reconfigured (e.g., as either a buck converter or a boost converter) to convert the power received from the stack 20 in an appropriate manner for delivery to the bus 56.

When the stack 20 is operated in the electrochemical pump mode, the controller 100 causes the polarity switches B and C to open and the polarity switches A and D to close, thus coupling the stack terminal 70 to the power conditioning subsystem terminal 76, and the stack terminal 72 to the power conditioning subsystem terminal 74. In this configuration, the polarity of the voltage across terminals 70(−) and 72(+) is reversed, and the power conditioning subsystem 50 provides a current flow to the stack 20 through terminals 72 and 70. During this mode of operation, the controller 100 may also reconfigure the power conditioning subsystem 50. For instance, the dc-to-dc converter 52 may be reconfigured (e.g., as either a buck converter or a boost converter) as necessary to provide power from either the energy source 60 or the AC grid via inverter 66 through the bus 56 to the stack 20.

In some embodiments of the invention, the polarity switches A, B, C, and D may be a plurality of contactors that are controlled by a plurality of switching control signals 112 provided by the controller 100. However, regardless of the types of switches A, B, C and D and the control signals 112 provided, the switching of the switches A, B, C, and D in response to control signals 112 should be controlled in manner that ensures that the switches A, B, C and D open and close in the appropriate sequence such that a short circuit is not imposed across the stack terminals 70 and 72. For instance, if the stack 20 is operating in the power mode in which switches B and C are closed, if switch A closes before switch B is opened, a short circuit will result across terminals 70 and 72. In addition, the switching also should be controlled so that it occurs at the appropriate time to ensure that the mode of operation of stack 20 is not changed inadvertently or before the system 10 has been placed in condition for changing the operation mode.

Figure 5:
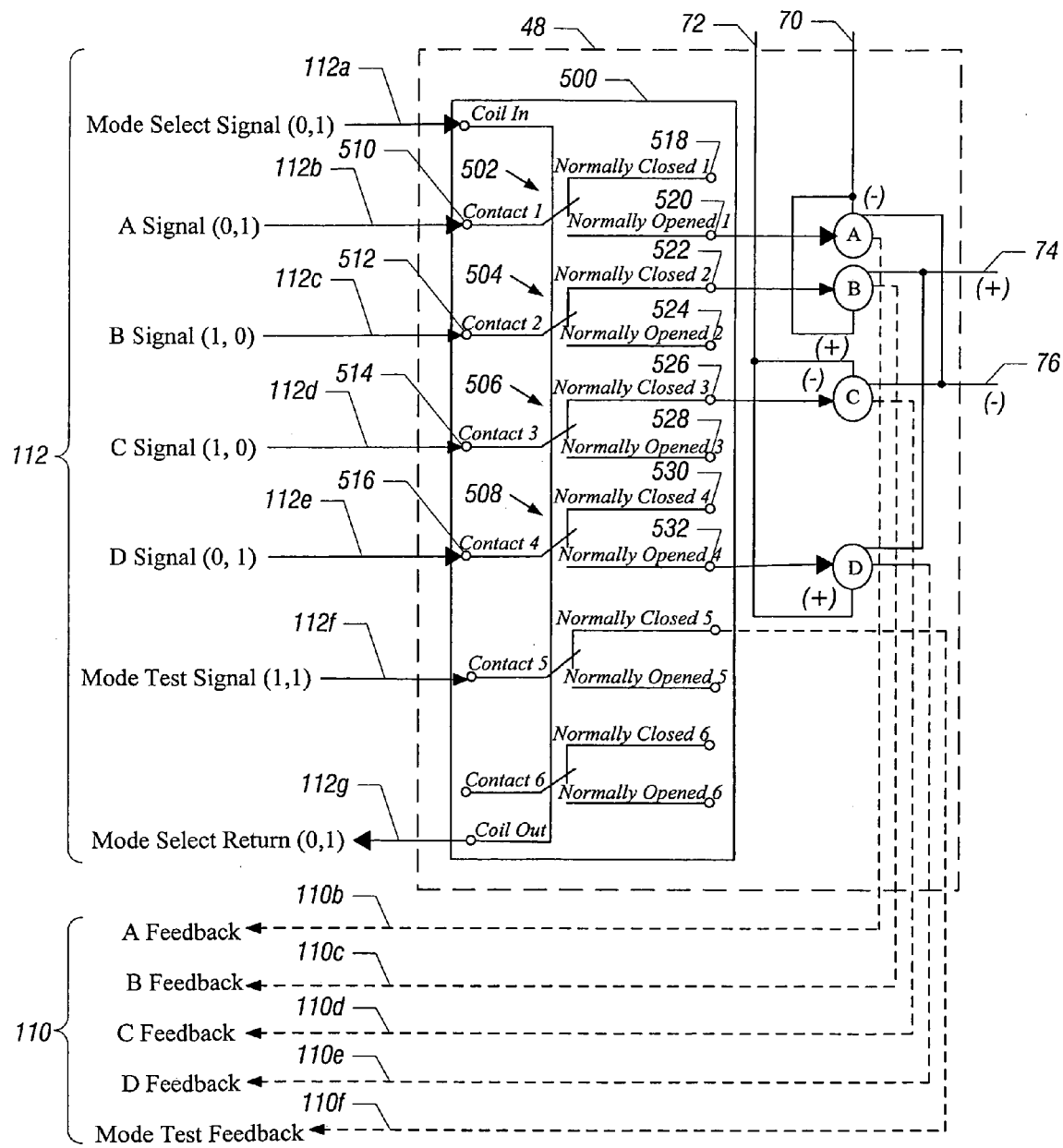
FIG. 5 is a schematic diagram illustrating an embodiment of the polarity switching subsystem that includes control switches to control the polarity switches according to an embodiment of the invention.

Thus, in some embodiments of the invention, such as illustrated in FIG. 5, the configuration and reconfiguration of polarity switches A, B, C and D may be controlled by a plurality of control switches 502, 504, 506, and 508, such as the switches of the multiple pole, double throw relay 500 shown in FIG. 5, although other types and configurations of control switches also are contemplated. In the embodiment illustrated in FIG. 5, switching control signals 112*b, c, d* and *e* generated by the controller 100 are communicated to each of a plurality of poles 510, 512, 514 and 516 of the switches 502, 504, 506 and 508 of the relay 500. Polarity switches A and D are coupled to normally open contacts 520 and 532 of the control relay 500, and switches B and C are coupled to normally closed contacts 522 and 526 of the control relay 500. In addition, a mode select signal 112*a, g* generated by the controller 100 is communicated to the coil of the control relay 500 to control the switching of the various relay switches 502, 504, 506 and 508. Thus, noise on any of the switching control lines 112, *b, c, d*, and *e* may not cause inadvertent switching of the polarity switches A, B, C and D without also receiving the mode select signal 112*a, g* from the controller 100. In addition, in the event that undesirable noise is present on the mode select signal line 112*a, g*, all of the relay control switches 502, 504, 506 and 508 will change state, thus preventing a short circuit across the stack terminals 70 and 72. Although the control switch 500 is illustrated as a six pole, double throw relay, other switching configurations also are envisioned, such as a plurality of control switching relays, which are appropriately arranged to prevent inadvertent switching of the polarity switches A, B, C and D.

In some embodiments, the controller 100 may also communicate a mode test signal 112*f* to the control relay 500. In response to the mode test signal 112*f*, a mode test feedback signal 110*f* is communicated back to the controller 100 from which the controller 100 may determine whether the control relay 500 is operating in the intended manner. In addition, polarity switch feedback signals 110, *b, c,* and *d* may be communicated to the controller 100 from each of the polarity switches A, B, C and D so that the controller 100 may determine whether the switches A, B, C and D are operating properly and in the appropriate configuration for the selected mode of operation.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method useable with a dual mode electrochemical cell stack, comprising:
   providing a polarity switching subsystem having a plurality of polarity switches coupled between the dual mode electrochemical cell stack and a power conditioning subsystem;
   configuring the plurality of polarity switches in a first configuration to operate the stack in a first mode of operation in which a voltage across the stack has a first polarity; and
   configuring the plurality of polarity switches in a second configuration to operate the stack in a second mode of operation in which the voltage across the stack has a second polarity opposite the first polarity,
   wherein the plurality of polarity switches are controlled such that a short circuit is not imposed across stack terminals.

2. The method of claim 1, further comprising providing a mode select signal to select one of the first mode of operation and the second mode of operation, wherein the plurality of polarity switches are configured to operate the stack in one of the first mode of operation and the second mode of operation in response to the mode select signal.

3. The method of claim 1, wherein providing the plurality of switches comprises:
   providing a first polarity switch coupled between a first terminal of the stack and a first terminal of the power conditioning subsystem;
   providing a second polarity switch coupled between the first terminal of the stack and a second terminal of the power conditioning subsystem;
   providing a third polarity switch coupled between a second terminal of the stack and the first terminal of the power conditioning subsystem; and
   providing a fourth polarity switch coupled between the second terminal of the stack and the second terminal of the power condition subsystem,
   wherein, in the first configuration, the first polarity switch and the fourth polarity switch provide a path for electrical current to flow between the stack and the power conditioning subsystem, and, in the second configuration, the second polarity switch and the third polarity switch provide a path for electrical current to flow between the stack and the power conditioning subsystem.

4. The method of claim 1, wherein the first mode of operation is a power producing mode in which electrical current flows from the stack to the power conditioning subsystem, and the second mode of operation is an electrochemical pumping mode in which electrical current flows from the power conditioning subsystem to the stack.

5. The method of claim 2, further comprising providing a plurality of control switches coupled to the plurality of polarity switches, wherein the plurality of control switches configure the plurality of polarity switches in one of the first configuration and the second configuration in response to the mode select signal.

6. The method of claim 5, further comprising:
   communicating a polarity switching signal to each of the control switches; and
   in response to the mode select signal, switching each of the control switches to selectively communicate the polarity switching signals to the polarity switches.

7. The method of claim 6, wherein the plurality of control switches are provided by a relay having a coil to switch the control switches, and wherein the mode select signal is communicated to the coil.

* * * * *